W. E. Clark,
Cutting Printers Leads and Rules.
N° 81,140. Patented Aug. 18, 1868.
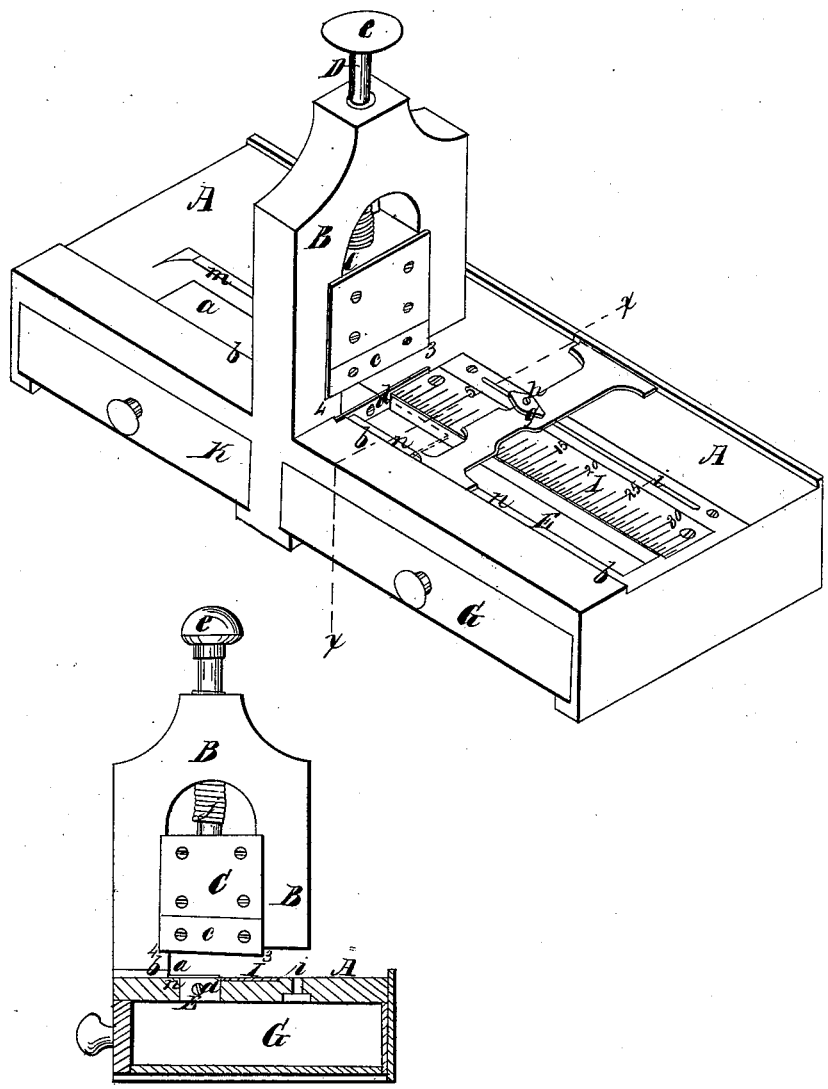
Witnesses:
Inventor:
Wm E. Clark

United States Patent Office.

WILLIAM E. CLARK, OF BOSTON, MASSACHUSETTS.

Letters Patent No. 81,140, dated August 18, 1868.

IMPROVEMENT IN CUTTING PRINTERS' LEADS.

The Schedule referred to in these Letters Patent and making part of the same.

TO ALL WHOM IT MAY CONCERN:

Be it known that I, WILLIAM E. CLARK, of Boston, in the county of Suffolk, and State of Massachusetts, have invented an Improved Machine for Cutting Printers' "Leads" and "Rules," of which the following is a full, clear, and exact description, reference being had to the accompanying drawings, making part of this specification, in which—

Figure 1 is a perspective view of the front side and right-hand end of my improved machine.

Figure 2 is a transverse section on the line $x\ x$ of fig. 1.

Similar letters refer to the same parts in both of the drawings.

Each of the machines heretofore used for cutting printers' "leads" and "rules" to the required lengths, consists of a bed or table, having a movable cutter pivoted to it at one end, the said table or bed being provided with a guide on its upper surface, and with an adjustable gauge; and the "lead" or "rule" is pushed in upon the table until it strikes said adjustable gauge, when the piece of lead to be cut off is held down on said table and against the said guide and said adjustable gauge, with one hand of the operator, so as to secure accuracy in cutting, while the movable cutter is operated with the other hand, the remaining portion or main stock of the lead from which the piece has been cut, dropping down and leaving the severed piece of lead on said table. When it is desired to cut another piece, the said main stock must be picked up, and again pushed on to the table and against the adjustable gauge and guide, after removing, by the hand, the piece first cut off.

This picking up of the main stocks of the "leads," and removing from the table the pieces cut off, consumes much valuable time, and occasions delay and inconvenience, while, when it is desired to cut a lead of a different length, the gauge requires to be set at a definite distance from the cutter by a line of "quadrates" placed upon the table, and corresponding to the length of the piece of lead to be cut.

My invention has for its object to overcome these difficulties, delays, and inconveniences, and consists—

First, in a table, having a guide on its upper surface, and a movable and stationary cutter, so constructed and connected with said table and guide that when said movable cutter descends, and commences to sever a "lead," the said movable cutter will press said "lead" against the said guide, for the purpose of cutting or severing the said "lead" with great accuracy.

Second, in a rest or shelf, to support that portion of a lead which it is desired to sever from the main stock, the purpose of said rest or shelf being to prevent the lead from being bent by its own weight, or any other cause, when said lead is projected forward between and beyond said movable and stationary cutter.

Third, in a slot, made through said table, for the purpose of allowing the severed piece of lead, the moment it is separated from the main stock, to fall through said slot into or upon a receptacle below, when said slot is used in combination with the said guide-end, said shelf, and a movable and stationary cutter.

Fourth, in a graduated scale, in combination with a movable and stationary cutter, so connected with a table, having a guide on its upper surface, that when said movable cutter descends and commences to sever a lead, the said movable cutter will press said lead against the said guide, for the purpose of cutting or severing the said lead with great accuracy, the purpose of said graduated scale being to enable me to sever leads of any length desired, with very great facility and expedition.

To enable others skilled in the art to understand and use my invention, I will proceed to describe the manner in which I have carried it out.

In the said drawings, A is the bed or table upon which the "lead" or "rule," $a$, to be cut or severed is placed, with one of its edges resting against the guide $b$. From this bed A rises a frame, B, in which is hung, so as to slide vertically, a block, C, carrying at its lower end the cutter $c$, which operates in connection with a stationary cutter, $d$, set into a slot in the table A.

The cutter $c$ is operated by means of a stem or shaft, D, which works vertically through the top of the frame B, and is provided with a knob, $e$, the cutter being retracted, after the cut has been made, by means of a spiral spring, f, surrounding the stem D. The edge of the cutter c is inclined slightly upward from 3 to 4, so that it will commence to cut the lead on the side opposite to that which rests against the guide b, and thus tend to force said lead against the said guide, and keep said lead in place while being cut.

The cutters c d are both secured in place by means of screws, so that they can be removed, for the purpose of being sharpened when required.

E is a long slot or opening in the table A, through which the piece cut from the lead or rule falls into a drawer, G, placed beneath, the width of the slot being such that the end of the lead, (shown in red lines in fig. 1,) which projects beyond the cutter and over and upon the rest or shelf n, fig. 1, will be supported on one side only, and will thus be free to fall as soon as it is severed from its main stock.

The length of the piece to be cut from the end of the lead or rule is determined by means of an adjustable gauge, H, which is secured in position by a nut, g, and a screw, h, the latter working in a slot, i, cut through the table A; and to facilitate the setting of the gauge H, a graduated scale, I, is secured to the bed A, on one side of the slot E, the scale being divided off into pica "ems" and parts of "ems," the ordinary method of measuring used by all printers.

It will thus be seen that, by means of the graduated scale, the gauge can be instantly set at the required distance from the cutters, without the necessity of carrying a line of "quadrates" and placing them upon the table against the gauge, as has heretofore been necessary, and a great saving in time and labor is thereby effected.

The piece cut off from the end of the main stock of the lead, as soon as it is severed, drops through the slot E, as before stated, thus allowing the remaining portion of the "lead" to be moved along by hand against the gauge H, when the operation is repeated, and so on, until the main stock of the lead is cut into the desired number of pieces, no time being lost in removing the piece cut off, or in picking up the main stock of the lead, as has been necessary with all machines heretofore in use.

m is a slot or opening in the table A, through which the waste pieces of the leads are passed into a drawer, K, beneath, instead of being allowed to lie, as heretofore, upon the table.

The drawers G and K form convenient receptacles for the "leads," but said drawers may be dispensed with, if desired.

I do not confine myself to a cutter, operated vertically by percussion, as it is evident that a cutter of a different construction might be employed, without departing from the spirit of my invention.

The above-described machine is particularly adapted for use where large quantities of leads or rules are to be cut into lengths, as it enables the operator to perform his work continuously, without the delay and inconvenience heretofore experienced.

Letter n, fig. 1, denotes the rest or shelf, for supporting that portion of the "lead" which projects beyond the cutters, and which is to be severed from the main stock, the said rest or shelf being broad enough to support the weight of said lead, and yet so narrow as to allow the severed piece of lead to fall through the slot E, the moment said severed "lead" is cut off from the main stock.

Printers' "leads," before they are cut up for use, are long thin pieces of type-metal, about five-eighths of an inch wide, and made of different thicknesses—some as thin as thin card-board, others much thicker. They are cut, for use, to the length of the lines of type between which they are to be placed for the purpose of spreading apart the said lines of type. They must be cut with great accuracy, and without being bent, broken, or bruised.

It is obvious that a thin "lead" of the length of the width of a quarto, octavo, or even a duodecimo page, is a delicate object to handle and cut, and is very liable to be bent, bruised, or broken in the process of cutting, especially by the lead-cutters heretofore made.

In all the lead-cutters heretofore made, the movable cutter descends upon the lead, and commences cutting from that side of said lead which rests against the guide on the upper side of the table, and in so doing, said movable cutter tends to press said lead away from the said guide, and it often happens that the operator neglects to keep said lead pressed hard enough against said guide to prevent the force of said cutter from causing said lead to swivel out from its proper position, and so spoil the severed piece. By my invention no such movement of said lead can occur, for the pressure on said lead from my cutter is in a direction toward and against the said guide.

I am aware that graduating-scales have been used on machines for cutting sheet metals, as shown in the patent to L. T. Hurlburt, of August 4, 1864; but they have not been used divided off into pica "ems," as provided for in my machine.

I am also aware that movable and stationary cutters have been used, as shown in the above-named patent, and others; nor is the table, guide-board, shelf, or slot new of itself, but only in the particular combination claimed and for the purposes set forth.

What I claim as my invention, and desire to secure by Letters Patent, is—

1. The arrangement of the guide b, shelf n, a movable and stationary cutter, and slot E, substantially as and for the purpose described.

2. The arrangement of the graduated scale I, the adjustable gauge H, the movable and stationary cutter, and a guide, b, when constructed and operated as and for the purpose set forth.

WM. E. CLARK.

Witnesses:
P. E. TESCHEMACHER,
MILO W. ROBBINS.